United States Patent
Li et al.

(10) Patent No.: US 6,332,428 B1
(45) Date of Patent: Dec. 25, 2001

(54) PART-REPLACEABLE WATER DISPENSER FOR DOMESTIC ANIMALS

(76) Inventors: Fu-Yuan Li, No. 3-2, Alley 36, Lane 129, Wen Hua Rd., Ta Hsi Town; Ming-Yen Chiang, No. 5, Alley 20, Lane 1171, Chieh Shou Rd., Ta Hsi Town, both of Taur Yuan Hsien (TW)

( * ) Notice: Subject to any disclaimer, the term of this patent is extended or adjusted under 35 U.S.C. 154(b) by 8 days.

(21) Appl. No.: 09/584,975

(22) Filed: Jun. 2, 2000

(51) Int. Cl.[7] .................................................. A01K 7/00
(52) U.S. Cl. .................................................................. 119/75
(58) Field of Search ............................ 119/71, 72.5, 74, 119/75

(56) References Cited

U.S. PATENT DOCUMENTS

| | | | |
|---|---|---|---|
| 4,246,870 | * | 1/1981 | Gustin ..................................... 119/75 |
| 4,370,948 | * | 2/1983 | Atkins ..................................... 119/75 |
| 4,476,812 | * | 10/1984 | Dube et al. ............................. 119/75 |
| 4,633,816 | * | 1/1987 | Ove et al. ............................... 119/75 |
| 5,195,462 | * | 3/1993 | Gustin ..................................... 119/75 |
| 6,000,363 | * | 12/1999 | Rader ..................................... 119/75 |

\* cited by examiner

*Primary Examiner*—Charles T. Jordan
*Assistant Examiner*—Elizabeth Shaw
(74) *Attorney, Agent, or Firm*—Michael D. Bednarek; Shaw Pittman LLP

(57) ABSTRACT

A water dispenser detachably connected to a joint on a trough for supplying water to domestic animals is provided. The water dispenser mainly includes a stopper having an upper sleeve portion screwed into the joint, a lower tubular portion being beveled to provide a curved cut, and a control opening located in the stopper between the sleeve and the tubular portions. A control rod having a flange provided near an upper end thereof is disposed in the stopper with the flange closing the control opening and a lower part of the control rod extended into the tubular portion to expose from the curved cut. A ring nut is screwed to the sleeve portion to confine a spring to the stopper between the ring nut and the flange of the control bar, so that the spring normally pushes the flange downward to tightly close the control opening and thereby stop water from flowing from a water pipe screwed into an upper end of the joint into the trough via the water dispenser. When the control bar is biased, a gap is produced in the water dispenser between the flange and the control opening, allowing water to flow from the water pipe into the trough via the water dispenser.

2 Claims, 5 Drawing Sheets

PART-REPLACEABLE WATER DISPENSER FOR DOMESTIC ANIMALS

BACKGROUND OF THE INVENTION

The present invention relates to a part-replaceable water dispenser for domestic animals, and more particularly to a water dispenser that is mounted on a trough and includes parts that can be easily replaced when necessary to extend usable life of the water dispenser.

FIG. 1 illustrates a conventional water dispenser mounted on a trough 1 for supplying water to domestic animals under control. The trough 1 is provided at a top portion with a threaded hole 11 into which an externally threaded coupler 2 is screwed. A generally cross-shaped push member 3 is mounted in the coupler 2 at a predetermined position. A spring 4 is also mounted in the coupler 2 above the push member 3 and is confined thereto by a ring nut 41 screwed into an upper end of the coupler 2, such that the spring 4 normally pushes the push member downward to close a water passage in the coupler 2. The push member 3 is provided at a lower end with a link 52 that is in turn connected at an end to a swing plate 5. The swing plate 5 is pivotally connected at an upper side to a shaft 51 that is fixed at two ends to two lateral walls of the tough 1. Finally, an iron water pipe 6 is screwed to an upper outer periphery of the coupler 2 for supplying water from the iron pipe 6 into the trough 1 via the water dispenser.

When a domestic animal, such as a pig, wants to drink water, it would touch and therefore push the swing plate 5 with its tongue, causing the swing plate 5 to swing about the shaft 51. At this point, the link 52 connected at one end to the lower end of the cross-shaped push member 3 and at the other end to the swing plate 5 is pushed inward relative to the trough by the swing plate 5 and thereby shifts the push member 3 upward. When the push member 3 is shifted upward, it no longer closes the water passage in the coupler 2 and allows water to flow from the iron pipe 6 into the trough 1 via the coupler 2 of the water dispenser. When the domestic animal leaves the swing plate 5, the spring 4 in the coupler 2 automatically pushes the push member 3 downward to close the water passage in the coupler 2 again.

The following are some disadvantages found in the above-described conventional water dispenser for domestic animals:

1. It is possible that a domestic animal plays the swing plate 5 not because it wants to drink water. And it is possible that the domestic animal exerts extra force to knock the swing plate 5 and causes damaged swing plate 5, push member 3 or spring 4 to prevent the water dispenser from functioning normally to supply or stop supplying water into the trough 1. In the event such damaged swing plate 5, push member 3 or spring 4 is not timely found and replaced, it is possible that the domestic animal dies of thirsty.
2. The trough 1 and the coupler 2 of the water dispenser are made of iron and frequently contact with water, and therefore tend to rust after they have been used for a period of time. Rusted trough 1 and rusted coupler 2 would cause stuck connection between the coupler 2 and the trough 1, the iron water pipe 6 and/or the ring nut 41, resulting in difficulties in change or replacement of individual parts of the water dispenser. Moreover, the conventional water dispenser is designed without taking into consideration the space needed by any hand tool to change or replace any part of the water dispenser. As a result, it is a common practice of most feeders to change or replace the whole water dispenser or even the iron water pipe 6 when there is any damaged part in the water dispenser. It is, of course, not economical for the feeders to expend a lot of money to buy a whole new set of water dispenser when there is only a small part of it that needs to be repaired or replaced.

It is therefore tried by the inventor to develop a part-replaceable water dispenser for domestic animals to eliminate the drawbacks found in the conventional water dispenser for domestic animals.

SUMMARY OF THE INVENTION

A primary object of the present invention is to provide a part-replaceable water dispenser for domestic animals, so that the whole water dispenser and the parts thereof are not easily subject to damage by the domestic animals and can therefore have prolonged usable life.

Another object of the present invention is to provide a part-replaceable water dispenser for domestic animals, of which all parts are made of compound metal material and are therefore wear-resistant and anti-rust to facilitate quick and convenient disassembly and assembly of any parts of the water dispenser when necessary.

To achieve the above and other objects, the water dispenser for domestic animals according to the present invention mainly includes a stopper having an upper sleeve portion screwed into a joint provided on a separate trough, a lower tubular portion being beveled to provide a curved cut, and a control opening located in the stopper between the sleeve and the tubular portions. A control rod having a flange provided near an upper end thereof is disposed in the stopper with the flange closing the control opening and a lower part of the control rod extended into the tubular portion to partially expose from the curved cut. A ring nut is screwed to the sleeve portion to confine a spring in the stopper between the ring nut and the flange of the control bar, so that the spring normally pushes the flange downward to tightly close the control opening and thereby stop water from flowing from a water pipe screwed into an upper end of the joint into the trough via the water dispenser. When the control bar is biased, a gap is produced in the water dispenser between the flange and the control opening, allowing water to flow from the water pipe into the trough via the water dispenser.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
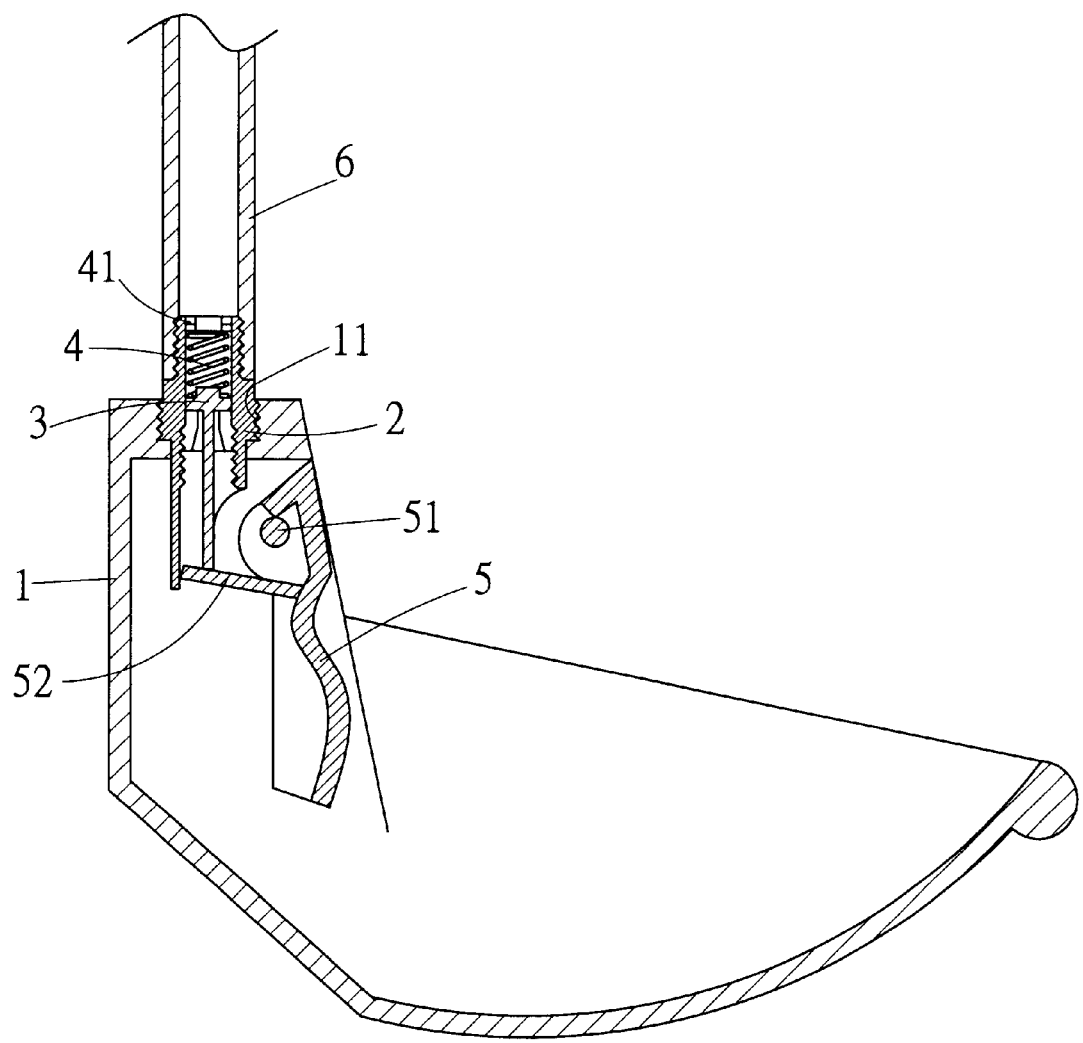
FIG. 1 is a side sectional view of a conventional water dispenser for domestic animals.
Figure 2:
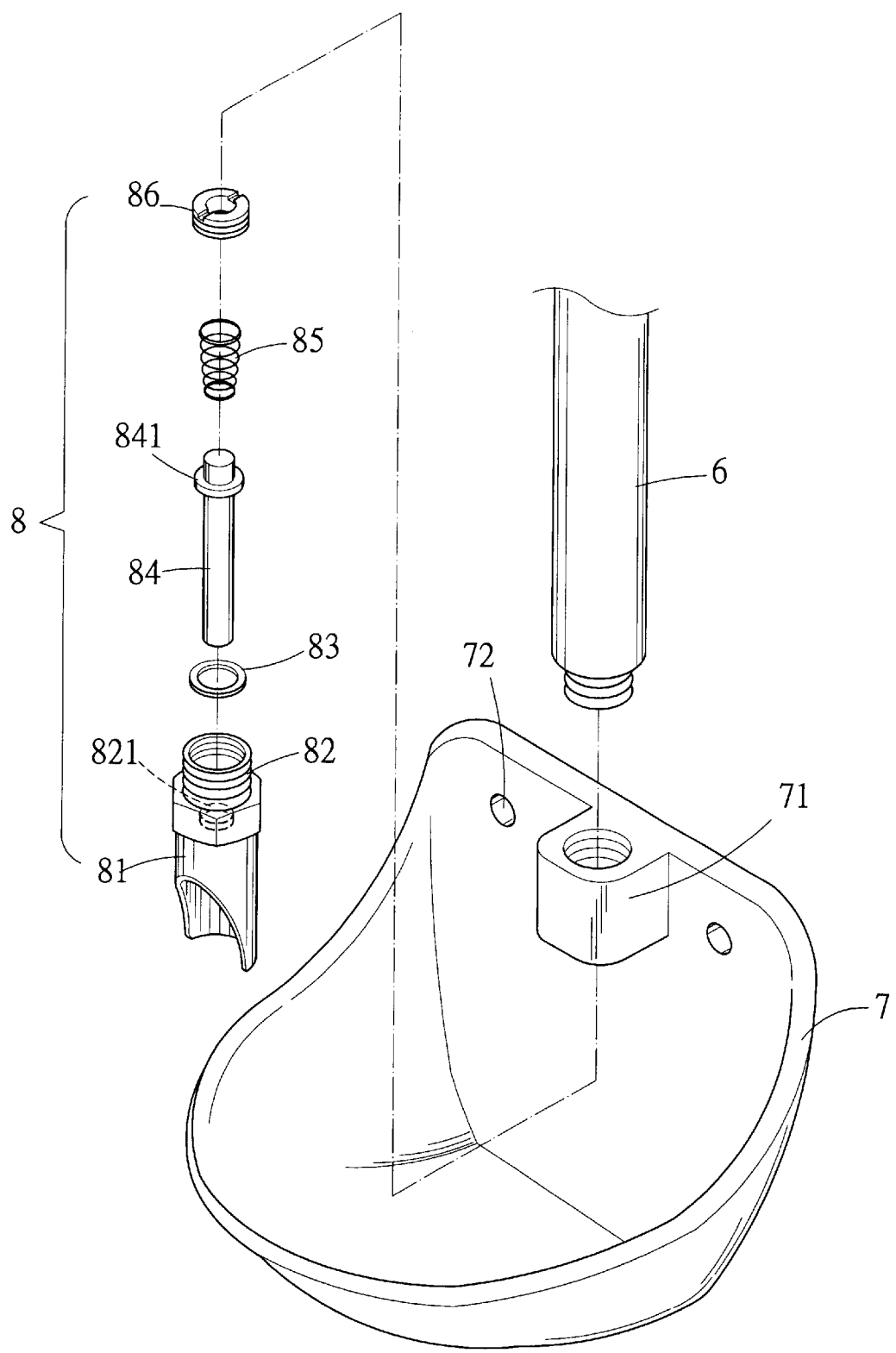
FIG. 2 is an exploded perspective of a part-replaceable water dispenser for domestic animals according to the present invention.

Please refer to FIG. 2 that is an exploded perspective of a part-replaceable water dispenser 8 for domestic animals according to the present invention.

As shown, the water dispenser 8 is mounted on a trough 7 that includes aback wall portion and a container portion extended from and located at a lower front of the back wall portion. The back wall portion of the trough 7 is provided at an inner upper middle area with an internally threaded joint 71. An iron water pipe 6 is detachably screwed into an upper end of the joint 71 and the water dispenser 8 is screwed into a lower end of the joint 71. The back wall portion of the trough 7 is also provided at two lateral sides of the joint 71 with two threaded mounting holes 72, so that the trough 7 could be mounted to a suitable place by extending suitable fastening means through the mounting holes 72.

The water dispenser 8 mainly includes a stopper, a control bar 84, a spring 85, and an externally threaded ring nut 86. The stopper includes a lower hollow tubular portion 81 and an upper externally threaded sleeve portion 82. A control opening 821 is formed in the stopper between the tubular portion 81 and the threaded sleeve portion 82. A lower part of the tubular portion 81 is beveled to form a curved cut. The control bar 84 is downward inserted from the threaded sleeve portion 82 into the stopper with a flange 841 formed near an upper end of the control bar 84 abutted on and normally closing the control opening 821 in the stopper. A sealing washer 83 is further disposed around the control bar 84 between the flange 841 and the control opening 821. The spring 85 is put around the control bar 84 above the flange 841. The externally threaded ring nut 86 is screwed into an upper end of the sleeve portion 82 of the stopper to confine the spring 85 to the stopper between the ring nut 86 and the flange 84.

Figure 3:
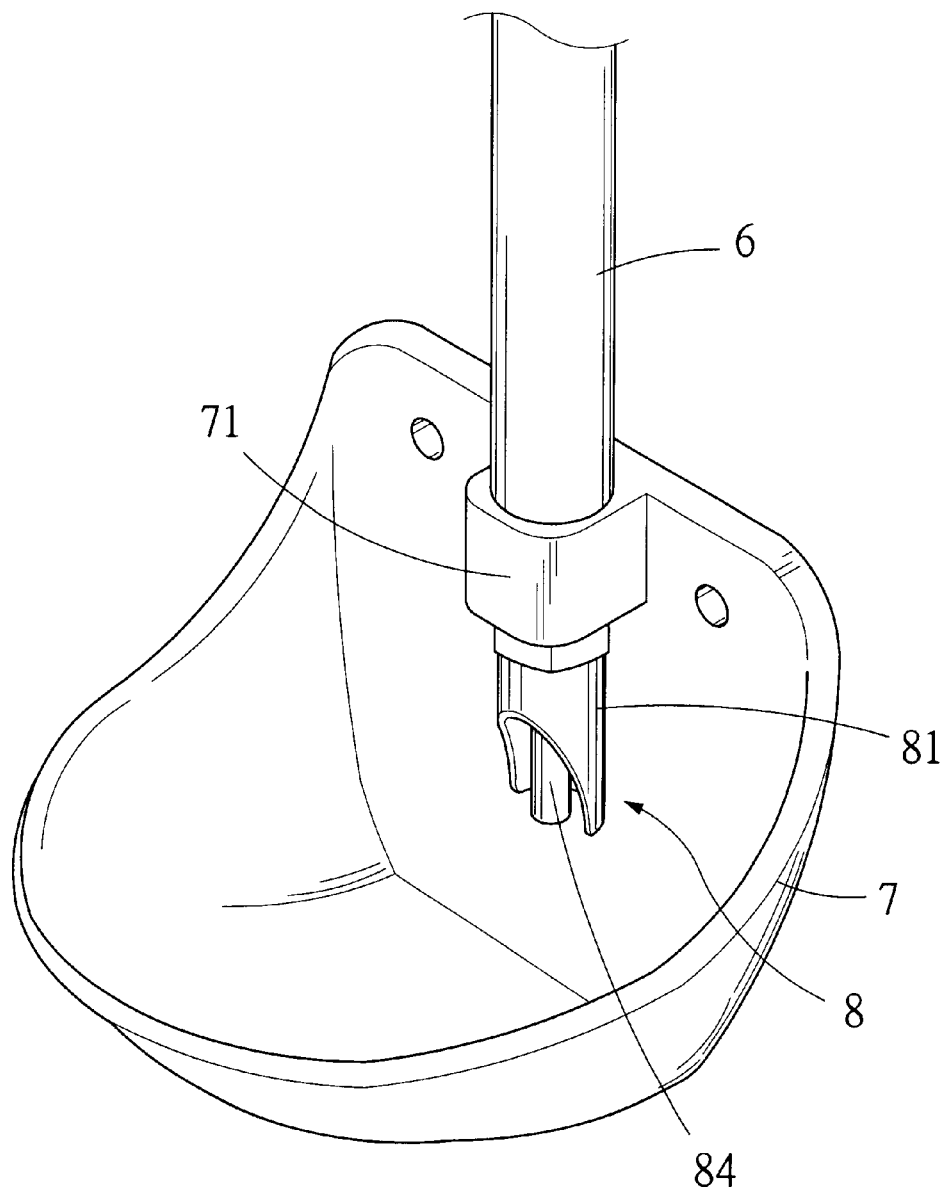
FIG. 3 is an assembled perspective of the part-replaceable water dispenser for domestic animals of FIG. 2.
Figure 4:
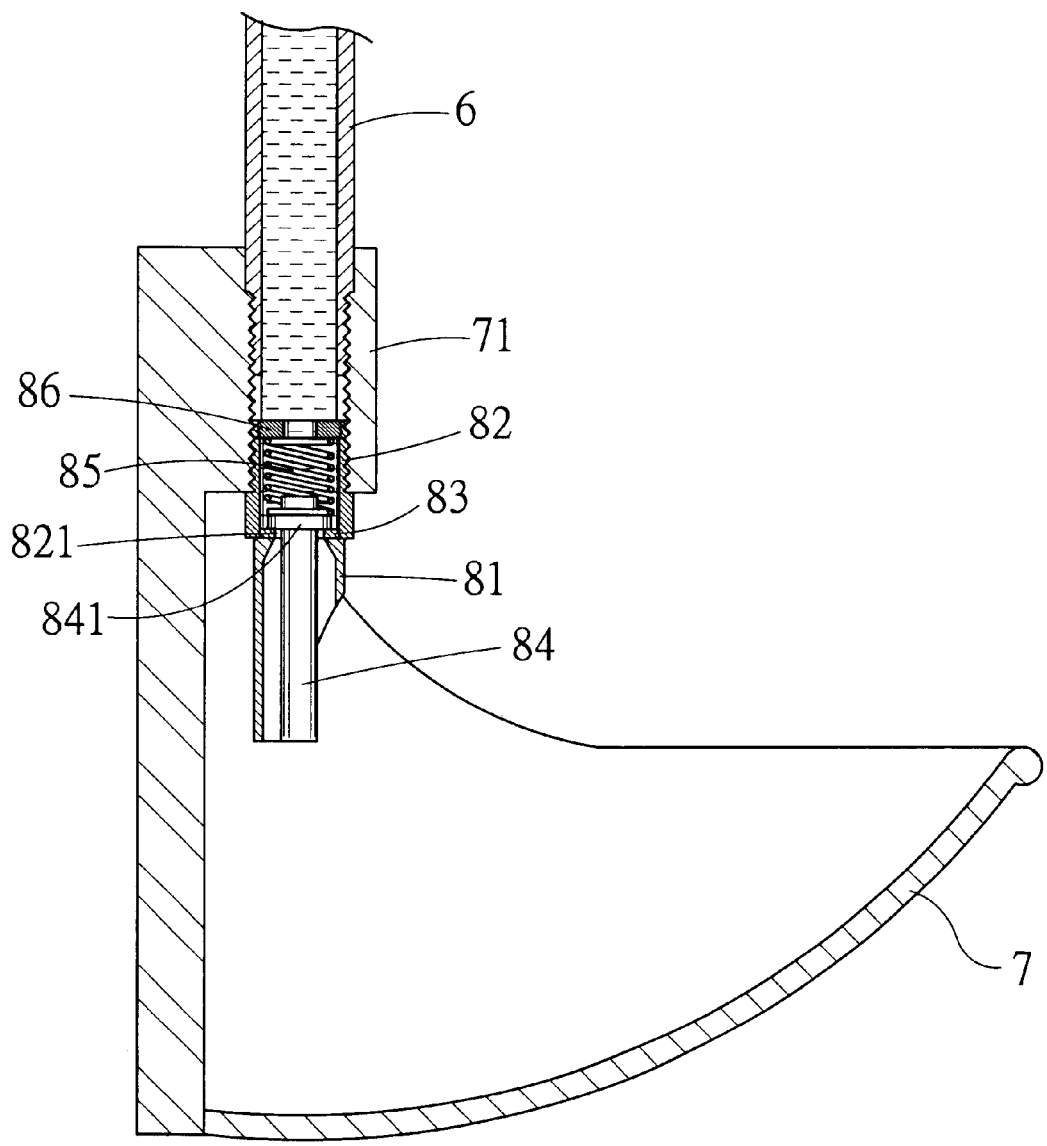
FIG. 4 is a side sectional view of the part-replaceable water dispenser for domestic animals of FIG. 3.

Please now refer to FIGS. 3 and 4 that are perspective and side sectional views, respectively, of the part-replaceable water dispenser 8 and the trough 7 in an assembled state. As shown, the water dispenser 8 is connected to the trough 7 by screwing the externally threaded sleeve portion 82 of the stopper upward into the lower end of the joint 71 provided on the trough 7, such that the iron water pipe 6 screwed into the upper end of the joint 71 and the sleeve portion 82 of the stopper are aligned with and closely connected to each other in the joint 71. When screwing the water dispenser 8 into the joint 71, let the curved cut on the tubular portion 81 of the stopper face away from the back wall of the trough 7, so that a lower part of the control bar 84 in the tubular portion 81 is exposed from the curved cut. The control bar 84 could be touched and biased within a degree defined by a lower peripheral wall of the tubular portion 81. That is, the control bar 84 is protected by the tubular portion 81 from being overly pushed and biased by an external force to such an extent that the control bar 84 is permanently displaced.

Figure 5:
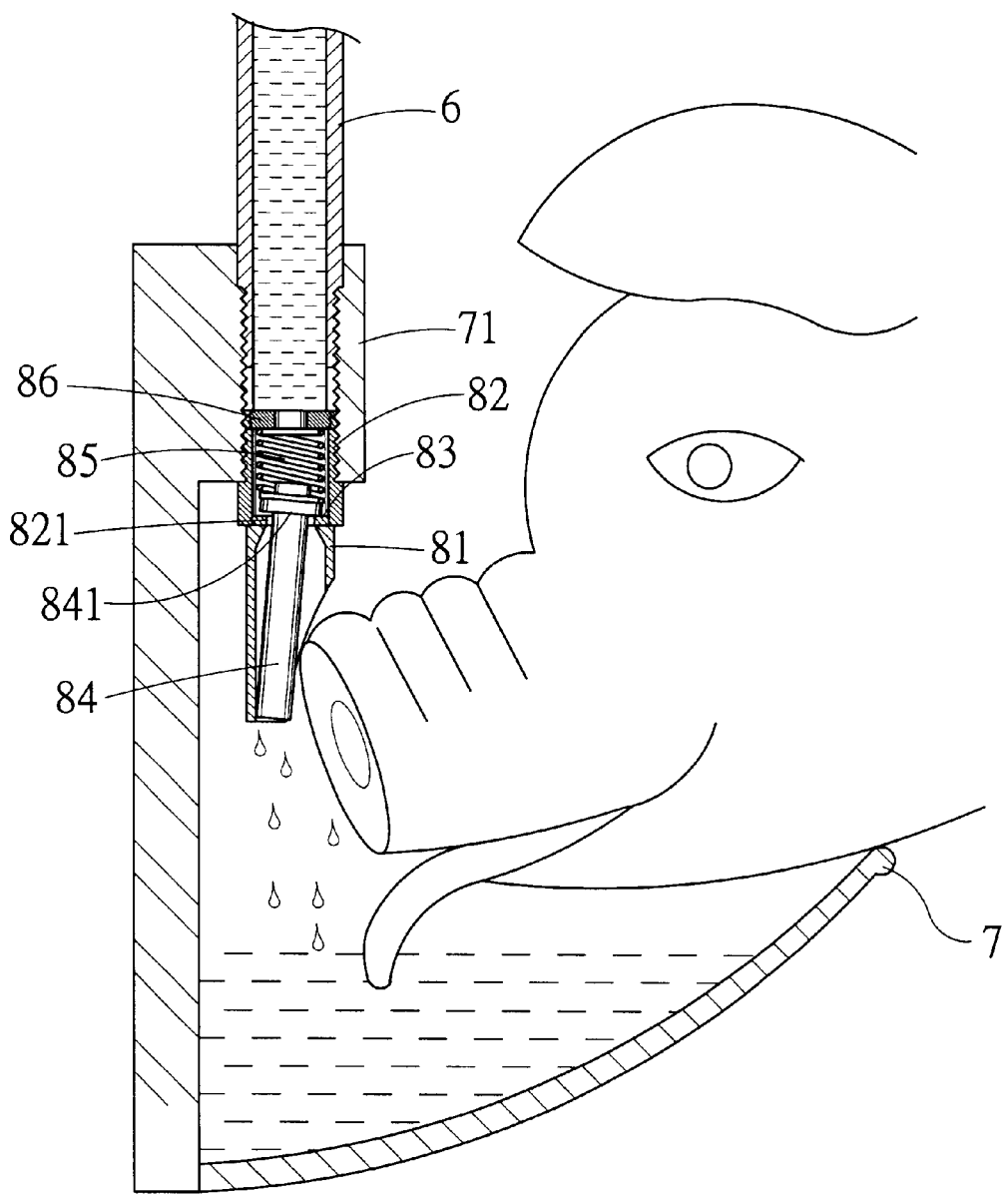
FIG. 5 illustrates the part-replaceable water dispenser for domestic animals of the present invention in use.

FIGS. 4 and 5 respectively illustrate the water dispenser 8 of the present invention in a non-touched and a touched condition. In FIG. 4, the water dispenser 8 is not touched by a domestic animal. In this non-touched condition, the control bar 84 is firmly pushed downward by the spring 85 disposed in the sleeve portion 82 of the water dispenser 8 between the ring nut 86 and the flange 841, so that the sealing washer 83 disposed between the flange 841 and the control opening 821 is tightly pressed by the flange 841 against the control opening 821 to seal the latter. Water stored in the iron water pipe 6 is therefore stopped by the sealed control opening 821 from flowing down into the trough 7 via the tubular portion 81 of the water dispenser 8. When any domestic animal, such as a pig as shown in FIG. 5, wants to drink water and uses its nose or tongue to touch and therefore bias the control bar 84, the flange 841 is caused to move away from its original downward pressed position and no longer tightly seals the control opening 821, leaving a gap between the flange 841 and the control opening 821. At this point, water stored in the iron water pipe 6 flows through the sleeve portion 82 via the ring nut 86 and into the tubular portion 81 via the gap between the flange 841 of the biased control bar 84 and the control opening 821 to finally flow into the trough 7. The control bar 84 can be biased only within a space defined by the lower wall of the tubular portion 81 of the stopper of the water dispenser 8. Whenever the domestic animal does not touch and bias the control bar 84, the latter automatically returns to its original straight downward extended position under a spring force of the spring 85 and thereby seal the control opening 821 again to stop supply of water into the trough 7 via the water dispenser 8.

The following are some advantages of the water dispenser 8 of the present invention:
1. The water dispenser 8 has an upper part firmly screwed into the joint 71 on the trough 7 and is therefore structurally strong enough to resist any external force applied on it by a domestic animal.
2. The control bar 84 could be biased only within a limited area defined by the lower wall of the tubular portion 81 and is therefore safe from damage due to being overly pushed by a domestic animal.
3. All the parts forming the water dispenser 8, including the stopper, the control bar and the ring nut, may be made of compound metal material to be anti-rust and wear-resistant and therefore have longer usable life.
4. All the parts forming the water dispenser 8 are screwed together and are therefore easily replaceable simply by loosening them relative to one another.

With the above arrangements, the part-replaceable water dispenser for domestic animals provided by the present invention is therefore superior to and more practical for use than the conventionally designed ones.

It is apparent that the present invention is illustrated with the description of a preferred embodiment thereof, and it is contemplated that many changes and modifications in the described embodiment can be carried out without departing from the scope of the invention which is intended to be limited only by the appended claims.

What is claimed is:

1. A part-replaceable water dispenser for domestic animals, being mounted on a trough having a back wall that is provided at an inner upper middle area with an internally threaded joint, such that a water pipe and said water dispenser are respectively detachably screwed to upper and lower ends of said joint for the purpose of easy replacement of said water dispenser when necessary, said water dispenser comprising a stopper, a control bar, a spring, and an externally threaded ring nut;

said stopper including a lower hollow tubular portion that has a lower part being beveled to provide a curved cut, an upper externally threaded sleeve portion that is screwed into said lower end of said joint on said trough, and a control opening formed in said stopper between said tubular portion and said sleeve portion;

said control bar being downward inserted from said sleeve portion into said stopper, such that a flange formed near an upper end of said control bar abuts on and normally closes said control opening in said stopper with a section of said control bar below said flange located in said tubular portion and partially exposed from said curved cut on said tubular portion, and a sealing washer being disposed around said control bar between said flange and said control opening;

said spring being put around said control bar above said flange; and said externally threaded ring nut being screwed into an upper end of said sleeve portion of said stopper to confine said spring to said stopper between said ring nut and said flange, so that said spring normally pushes said control bar toward said control opening for said flange and said sealing washer to tightly close said control opening;

whereby said control bar could be biased by an external force applied on it to a limited extent defined by a lower wall of said tubular portion of said stopper, in order to produce a gap between said flange on said control bar and said control opening of said stopper for water stored in said water pipe to flow down into said tubular portion and said trough via said gap, and said control bar could automatically return to an original position in said stopper to close said control opening again when said external force applied on said control bar is removed.

2. A part-replaceable water dispenser for domestic animals as claimed in claim 1, wherein said stopper, said control bar, said spring and said ring nut forming said water dispenser are preferably made of compound metal material for said water dispenser to be wear-resistant and anti-rust and have longer usable life.

* * * * *